2,893,680

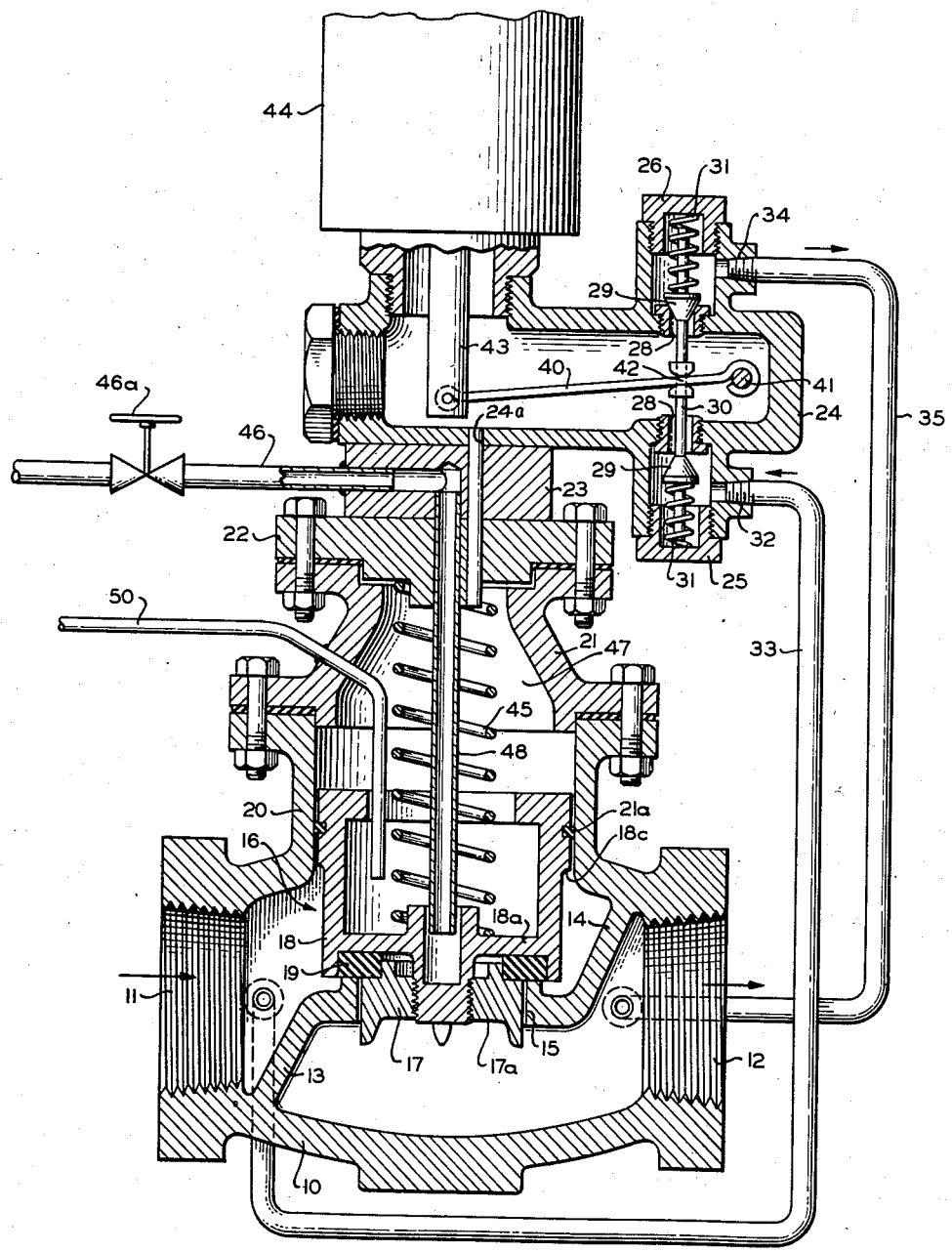

VALVE

Robert Rudolph Freund, Idaho Falls, Idaho, assignor to Phillips Petroleum Company, a corporation of Delaware Application January 10, 1955, Serial No. 480,717

1 Claim. (Cl. 251—30)

This invention relates to valves. In another aspect, it relates to a valve which is normally maintained in a defined position by fluid pressure.

In the operation of standby devices, a valve is oftentimes provided which is maintained either in open position or in closed position by fluid pressure. In standby systems, this pressure fluid oftentimes condenses interiorly of the valve, and interferes with rapid valve operation when the control mechanism of the valve is actuated. This difficulty is particularly serious in emergency systems, where rapidity of valve action is obviously of primary importance.

In accordance with this invention, I provide a valve which is maintained in one position by fluid pressure, there being a bleed conduit extending into the interior portions of the valve so that any condensate accumulating therein is rapidly and continuously ejected by the pressure fluid. In this manner, the interior parts of the valve are kept free from condensate, and a very rapid valve action can be obtained should an emergency condition arise.

Accordingly, it is an object of the invention to provide a valve of improved construction.

It is a further object to provide an emergency or standby valve which is maintained in one position by fluid pressure wherein condensate is continuously ejected from the interior of the valve.

It is a still further object to provide a quick-acting valve which is very reliable in operation, and of minimum complexity.

Various other objects, advantages and features of the invention will become apparent from the following detailed description taken in conjunction with the accompanying drawing, in which the figure is a vertical sectional view of a valve constructed in accordance with the invention.

Referring now to the drawing in detail, the valve includes a body 10 having an inlet section 11 and an outlet section 12. A pair of interior parts 13 and 14 within the valve body define a valve seat 15.

Cooperating with the seat 15 is a valve head 16 including a cylindrical head 17 threaded to a piston or cylinder 18 and provided with an annular gasket 19 arranged to fit upon the valve seat 15. The piston 18 is slidable within a cylindrical bore 20 forming a part of the valve body, and it is provided with an annular sealing gasket 21a.

Overlying the body portion 20 is a tapered metal section 21 which receives, at the top thereof, an end plate or cap 22. The cap 22, in turn, carries a metal block 23 upon which is supported a valve chamber 24. A pair of housing sections 25 and 26 protrude from the chamber 24, and each housing section has a valve seat 28 mounted therein with which cooperate a pair of valve heads 29. These heads 29 are secured to a common, vertically-extending rod 30 which has a pair of springs 31 surrounding it at the respective ends thereof, these springs bearing against the valve heads 29.

The chamber 25 has a fitting 32 to which a line 33 is connected, this line communicating with the inlet section 11 of the valve body 10. In similar fashion, the housing 26 has a fitting 34 to which is secured a line 35, this line being connected to the outlet section 12 of the valve body 10.

A control lever 40 has one end thereof pivoted at 41 within the chamber 24, and this lever is secured at 42 to the rod 30. The other end of the lever 40 is secured to a plunger 43 of a solenoid 44 which is suitably secured to the top of the chamber 24.

The valve is further provided with a spring 45 which has one end connected to the piston 18 and its other end connected to the cap 22.

In accordance with the invention, a bleed line 46 provided with a valve 46a communicates with the interior chamber or region 47 defined by the piston 18, and the members 20, 21 and 22 through a hollow stem 48 extending downwardly to the lower part of the piston 18, which is so shaped as to permit movement of the piston in an axial direction without interfering with the stem 48. Additionally, or alternatively, a bleed pipe or conduit 50 can be provided which extends through the wall of the member 20 to a region at the interior of the piston 18. Two bleed pipes may be desirable to minimize difficulties which would occur if a single pipe became clogged.

In operation, assuming that the valve is a standby valve on a steam line which can, for example, supply steam to an auxiliary power generating system, the rod 30 is in its lower position so that the valve in housing 26 is closed and the valve in housing 25 is open. As a result, steam pressure existing at the inlet section 11 is transmitted through the chamber 24, a passage 24a, and the chamber 47 to the upper part 18a of piston 18. A relatively low pressure exists at the lower surface 17a of the valve head so that a force is produced which, in cooperation with the spring 45, maintains the valve head 16 in engagement with the seat 15, thus preventing flow of steam from the inlet section 11 to the outlet section 12.

As steam condenses within the chamber 47, the resulting condensate is pressured out through the bleed line 46 or 50 so that no condensate accumulates within the chamber 47. Consequently, when the valve opens in the manner now to be described, no condensate is present in the interior of the valve to interfere with a rapid opening action. If the bleed conduit 46 or 50 were not provided, condensate accumulating interiorly of the valve would cause a delay of up to ten seconds in valve operation.

When the valve is to be actuated, solenoid 44 is energized, thus lifting lever 40 and rod 30 with the result that the valve in housing 25 is closed and the valve in housing 26 is opened, thus effecting communication between the outlet section 12, the chamber 24 and the interior portion 47 of the valve. The high pressure exerted at the surface 18c of the piston then causes the valve to open, and it remains open until the solenoid is deenergized, due to the pressure drop across the valve which causes a higher pressure to exist, after the valve has opened, at the lower surface of the valve head and piston than exists within the chamber 47.

It is a feature of the invention that the valve opens in a very rapid manner due to the fact that any condensate tending to accumulate in the interior parts of the valve has been expelled by the action of the steam in the chamber 47 forcing such condensate through the bleed conduit 46 or 50. If condensate were present and no bleed tube were provided, the condensate would have to be forced through the line 24a before the valve could open, thus delaying the opening of the valve as much as 10 seconds. The tubes 46, 50 being bleed tubes do not bleed off so much fluid as to prevent pressure building up in the chamber 47 when the valve 17 is closed.

While the invention has been described in connection with a present, preferred embodiment thereof, it is to be understood that this description is illustrative only and is not intended to limit the invention.

I claim:

A valve comprising, in combination, a valve body including a valve seat, a main valve head movable into and out of engagement with said seat, a piston attached to said valve head and movable in a piston chamber formed in the valve body, a spring connected between said piston and a stationary part of the valve body, a housing for receiving pressure fluid communicating with the interior of said piston chamber, a rod movable in said housing carrying an inlet valve head and an outlet valve head, each of said last-mentioned valve heads cooperating with a separate seat formed in said housing, thereby defining an inlet pilot valve and an outlet pilot valve, a line connecting the inlet pilot valve with a portion of the valve body upstream of the main valve head, an exhaust line connecting the exhaust pilot valve with a portion of the valve body downstream of the main valve head, a solenoid connected to said rod and arranged to open said outlet pilot valve and close said inlet pilot valve upon actuation thereof, a tube positioned axially of said spring and extending to a point near the bottom of said piston chamber, and a bleed conduit communicating with said tube and extending through the valve body, whereby condensate accumulating in the piston chamber is expelled through said bleed conduit.

References Cited in the file of this patent

UNITED STATES PATENTS

| | | |
|---|---|---|
| 743,952 | Lackaberry | Nov. 10, 1903 |
| 824,658 | Junggren | June 26, 1906 |
| 912,384 | Kimball | Feb. 16, 1909 |
| 1,664,493 | Smith | Apr. 3, 1928 |
| 2,207,809 | Lauffer | July 16, 1940 |
| 2,235,304 | Toussaint | Mar. 18, 1941 |

FOREIGN PATENTS

| | | |
|---|---|---|
| 141,773 | Austria | May 25, 1935 |